(12) United States Patent
Arenburg et al.

(10) Patent No.: US 7,480,901 B2
(45) Date of Patent: Jan. 20, 2009

(54) SYSTEM AND METHOD FOR PRODUCING PER-PROCESSOR OPTIMIZED EXECUTABLES

(75) Inventors: Robert Thomas Arenburg, Round Rock, TX (US); Franck Barillaud, Austin, TX (US); Bradford Lee Cobb, Cedar Park, TX (US); Shivnath Dutta, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 690 days.

(21) Appl. No.: 11/050,353

(22) Filed: Feb. 3, 2005

(65) Prior Publication Data

US 2006/0174234 A1    Aug. 3, 2006

(51) Int. Cl.
*G06F 9/45* (2006.01)
*G06F 9/44* (2006.01)

(52) U.S. Cl. .................. 717/153; 717/140; 717/166
(58) Field of Classification Search ............... 717/140, 717/147, 151
See application file for complete search history.

(56) References Cited

U.S. PATENT DOCUMENTS

| 5,781,777 A * | 7/1998 | Sato et al. ................. 717/160 |
| 2005/0071828 A1* | 3/2005 | Brokenshire et al. ......... 717/147 |
| 2005/0081182 A1* | 4/2005 | Minor et al. ................ 717/100 |

* cited by examiner

*Primary Examiner*—Tuan Q. Dam
*Assistant Examiner*—Isaac T Tecklu
(74) *Attorney, Agent, or Firm*—Duke W. Yee; Diana R. Gerhardt; Lisa L. B. Yociss (57) ABSTRACT

A method, computer program product, and a data processing system for generating a single object file from which a plurality of per-processor architecture executables may be produced. Source code includes instructions that are associated with a plurality of processor architectures and a plurality of instruction sets each associated with one of the plurality of processor architectures. The source code is compiled into an object file that includes common text and data associated with the plurality of processor architectures and a plurality of processor-specific data and text sets. The object file may then be linked by a processor of one of the plurality of processor architectures to produce an executable that is optimized for a plurality of processor architectures.

13 Claims, 5 Drawing Sheets

SYSTEM AND METHOD FOR PRODUCING PER-PROCESSOR OPTIMIZED EXECUTABLES

BACKGROUND OF THE INVENTION

1. Technical Field

The present invention relates generally to an improved data processing system and in particular to a method and computer program product for optimizing creation of software executables. Still more particularly, the present invention provides a method and computer program product for generating a processor specific virtualization layer that facilitates installation of a software executable optimized for a plurality of processor architectures.

2. Description of Related Art

Contemporary software vendors invest significant amounts of labor and capital to improve the speed of software products by using different optimization techniques for different processor architectures. The current approach is to deliver different executables each addressing a specific processor architecture. In such implementations, the software code is only optimized for a particular processor architecture. The deficiency of this approach is that every application has to be compiled and packaged multiple times thereby increasing the size of the distribution package and the management complexity. To obtain the best performance on a specific architecture, a user has to install the executable compiled specifically for the architecture on which the installation is being performed.

Thus, it would be advantageous to provide an improved mechanism for producing processor-optimized executables. It would further be advantageous to provide a mechanism for producing a processor-optimized executable for one of a plurality of processor architectures from a single object file. It would further be advantageous to provide a mechanism for installing a processor-optimized executable from an object file that supports executables optimized for a plurality of processor architectures.

SUMMARY OF THE INVENTION

The present invention provides a method, computer program product, and a data processing system for generating a single object file from which executables for a plurality of architectures may be produced. Source code includes instructions that are associated with a plurality of processor architectures and a plurality of instructions each associated with one of the plurality of processor architectures. The source code is compiled into an object file that includes common text and data associated with the plurality of processor architectures and a plurality of processor-specific data and text sets. The object file may then be linked by a processor of one of the plurality of processor architectures to produce an executable that is optimized for a plurality of processor architectures.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
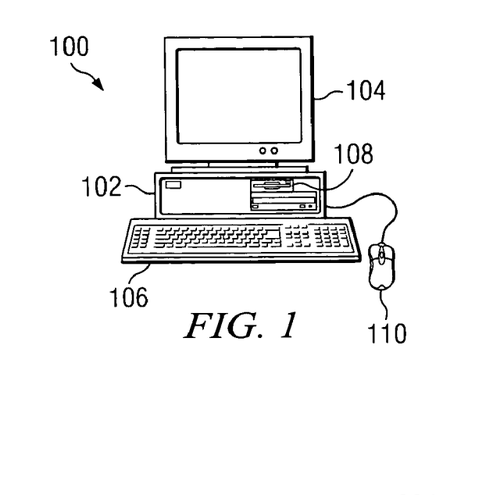
FIG. 1 is a pictorial representation of a data processing system in which a preferred embodiment of the present invention may be implemented.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
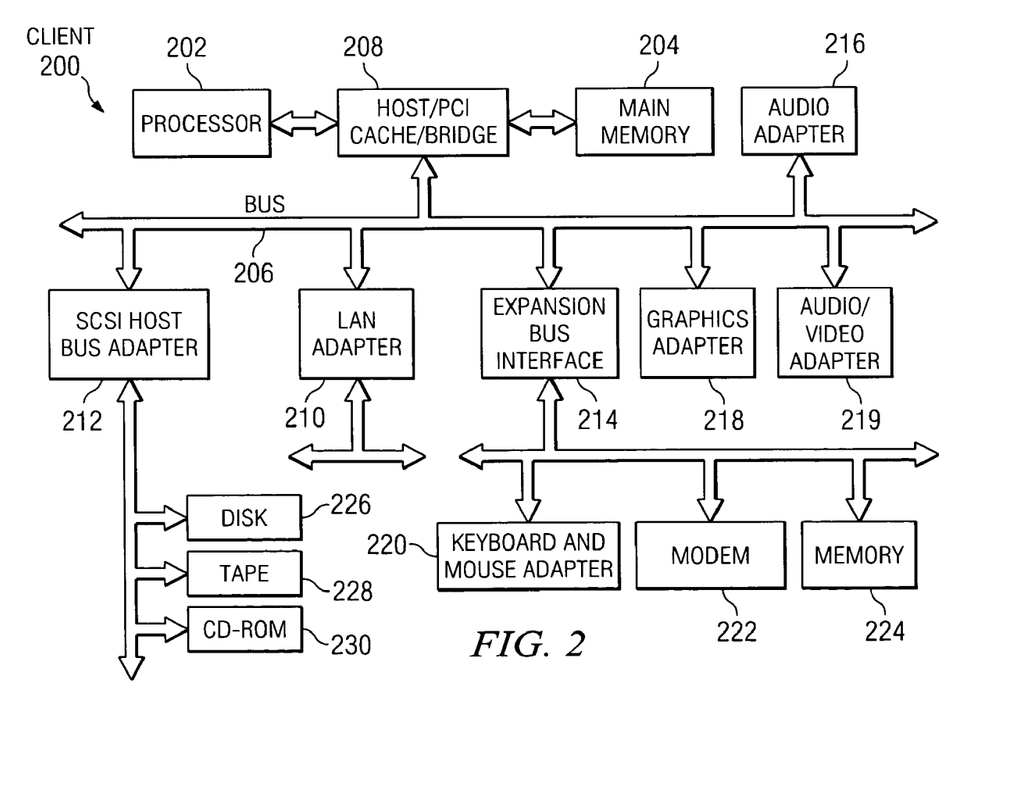
FIG. 2 is a block diagram of a data processing system in which a preferred embodiment of the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface SCSI host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer.

The processes of the present invention are performed by processor 202 using computer implemented instructions,, which may be located in a memory such as, for example, main memory 204, memory 224, or in one or more peripheral devices 226-230.

In contemporary approaches to developing software that is optimized for different processor architectures, source code may be enhanced with a series of directives that indicate to the compiler which part of the code will be in use for a particular processor architecture and/or processor specific compiler flags may be used for the entire source file. For example, if/else directives may be implemented to restrict the scope of the compiler to only certain portions of the code. The result is the creation of different executables.

Figure 3:
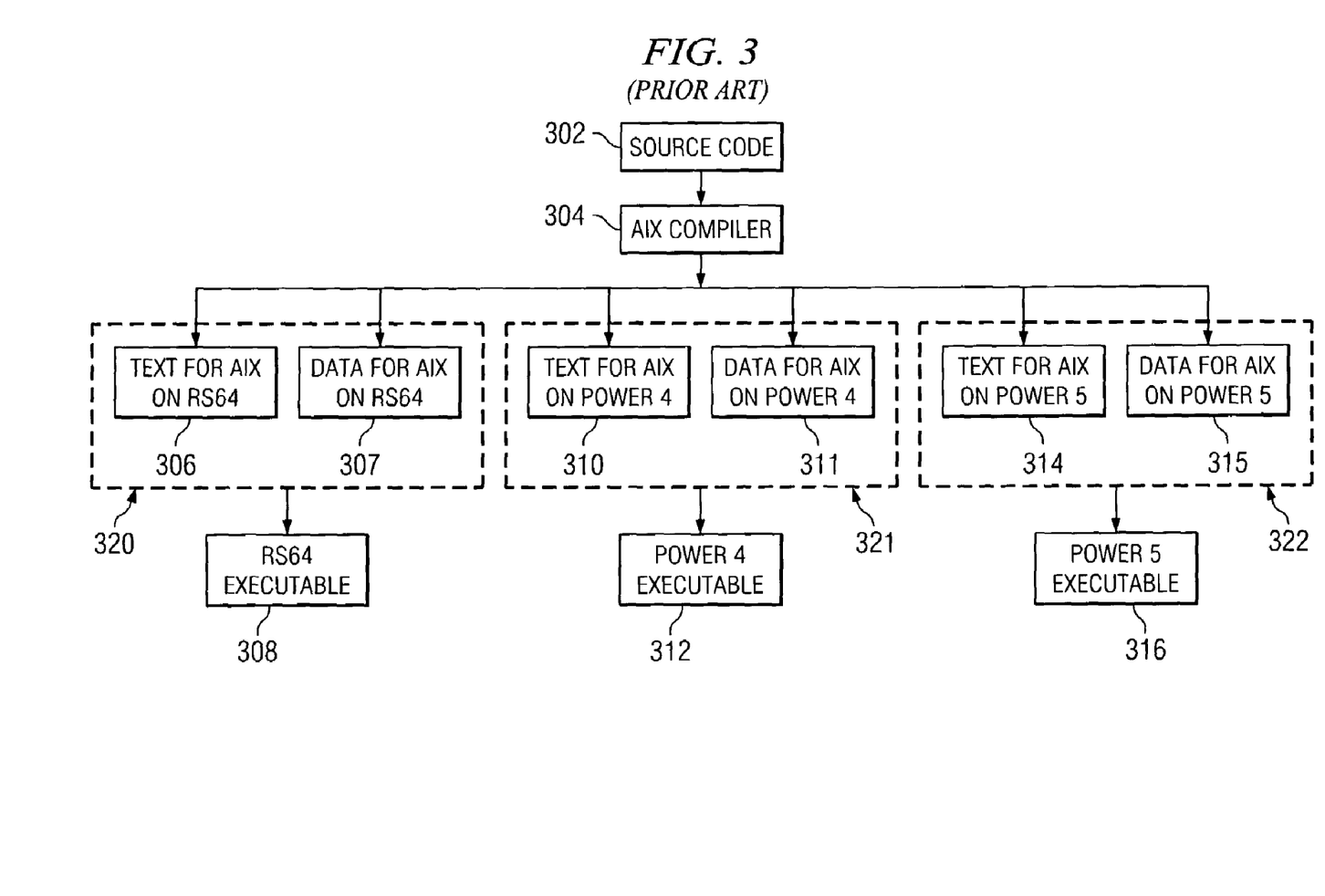
FIG. 3 illustrates a conventional approach for developing software executables optimized for different processor architectures.

For example, FIG. 3 illustrates a conventional approach for developing software executables optimized for different processor architectures. Source code 302 is developed and supplied to a compiler 304. In the illustrative example, compiler 304 comprises an AIX compiler although any such operating system compiler may be substituted therefor. During compilation of source code 302, compiler 304 will encounter directives that restrict the scope of the compiler to certain portions of source code 302. Each portion of the source code that is compiles based on a restrictive directive comprises code that is optimized for a particular processor architecture, such as RS64, Power4, and Power5 processors. Alternatively, or in addition to using directives that restrict the scope of the compiler, the compiler itself may take processor specific flags that cause the compiler to generate processor specific objects. Compilation of the source code then results in different object files 320-322 that are optimized for respective processor architectures based on the restrictive directives encountered during compilation. Each object file comprises a text section and a data section that includes respective text and data specific to a particular processor. For example, a portion of text section 306 is unique to object file 320, while other portions of text section 306 are commonly included in each of text sections 310 and 314 of object files 321 and 322 respectively. In the illustrative example, object file 320 comprises text section 306 and data section 307 optimized for the RS64. In a similar manner, object file 321 comprises text section 310 and data section 311 optimized for the Power4 processor, and object file 322 comprises text section 314 and data section 315 optimized for the Power5 processor. Executables 308, 312, and 316 that are optimized for a particular processor are then generated by linking respective object files 320-322. An executable, such as one of executables 308, 312, and 316, that is produced from code that is optimized for a particular processor architecture is referred to herein as a per-processor executable.

In accordance with a preferred embodiment of the present invention, a compiler creates a text portion and data portion commonly associated with a plurality of processor architectures and also creates data and text portions that are associated with a particular processor architecture. The common text portion and the common data portion are included in an object file along with one or more sets of data and text portions that are uniquely associated with one of the plurality of processor architectures. Accordingly, a single object file may be linked in a manner to produce an executable that includes binary data generated from the one or more sets of data and text portions respectively associated with one of the plurality of processor architectures. The link process links one of the sets of data and text portions respectively associated with one of the plurality of processor architectures with the common text and common data portions such that the executable is optimized for a particular processor architecture on which the executable is to be loaded. In this manner, a single object file is used to generate respective executables optimized for particular processors.

Figure 4:
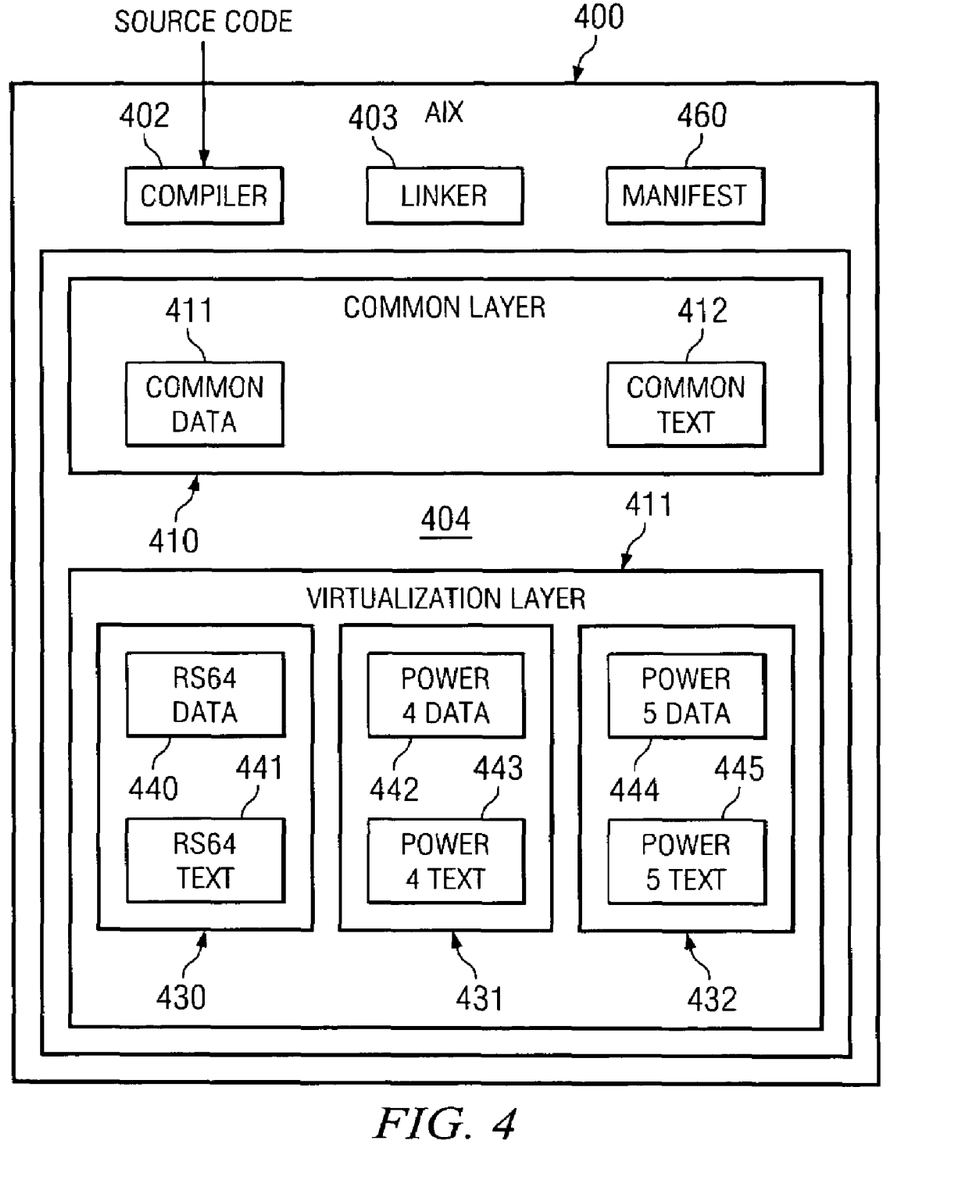
FIG. 4 is a diagrammatic illustration of components used in creation of module containing multiple processor-specific instructions generated in accordance with a preferred embodiment of the present invention.

FIG. 4 is a diagrammatic illustration of the components used for creation of an object file from which multiple processor-specific executables are generated in accordance with a preferred embodiment of the present invention. A compiler 402 receives source code including optimization directives or other delineators that identify source code that is optimized for a particular processor architecture. Compiler 402 generates object file 404 that includes common layer 410 and virtualization layer 411. Common layer 410 comprises common data 411 and common text 412 that is to be processed for generation of an executable that may be optimized for execution on a plurality of processor architectures. Virtualization layer 411 comprises a plurality of per-processor sets of data and text. For example data and text set 430 comprise data 440 and text 441 uniquely associated with one of a plurality of processors. In the present example, data 440 and text 441 are uniquely associated with the RS64 processor architecture. In a similar manner, data and text set 431 includes data 442 and text 443 uniquely associated with the Power4 processor architecture, and data and text set 432 includes data 444 and text 445 uniquely associated with the Power5 processor architecture. Linker 403 then may generate an executable by combining binary data derived from common layer 410 with binary data derived from a per-processor data and text set including per-processor data and per-processor text.

To facilitate generation of executables, compiler 402 additionally generates manifest 460 that describes the different architectures supported by the object file. In the illustrative example, manifest 460 comprises instructions that define supported processor architectures as the RS64 processor architecture, the Power4 processor architecture, and the Power5 processor architecture. Additionally, manifest 460 logically defines the association of data and text sets 430-432 with a particular processor architecture.

Figure 5:
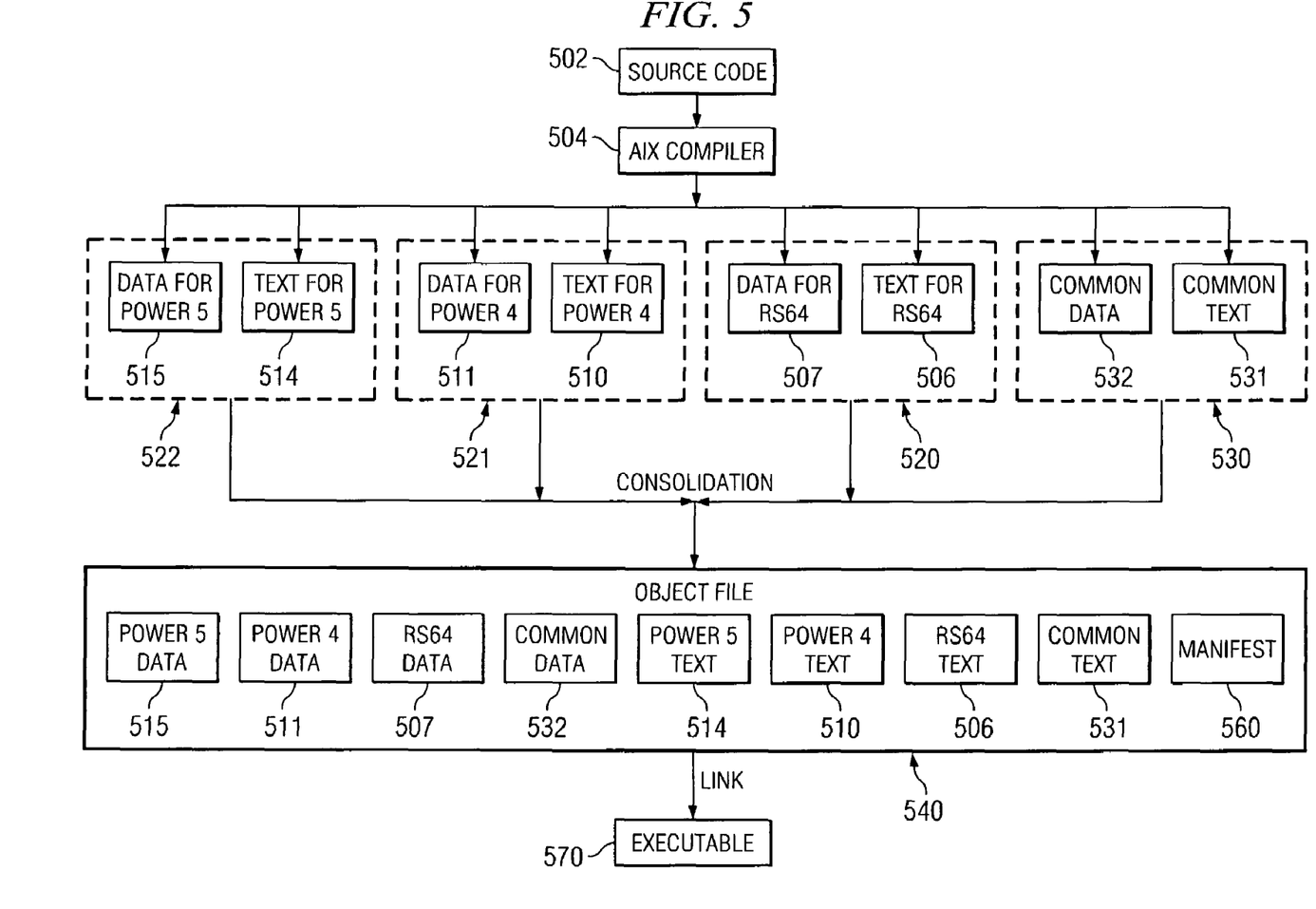
FIG. 5 is a diagrammatic illustration of a mechanism for developing software executables optimized for different processor architectures in accordance with a preferred embodiment of the present invention.

FIG. 5 is a diagrammatic illustration of a mechanism for developing software executables optimized for different processor architectures in accordance with a preferred embodiment of the present invention. Source code 502 is developed and supplied to compiler 504. In the illustrative example, compiler 504 comprises an AIX compiler although any such operating system compiler may be substituted therefor. During compilation of source code 502, compiler 504 will encounter directives that restrict the scope of the compiler to certain portions of source code 502. Each portion of the source code that is compiled based on a restrictive directive comprises code that is optimized for a particular processor architecture, such as RS64, Power4, and Power5 processors. Portions of the source code that are commonly associated with a plurality of processor architectures results in generation of common text and data set 530 that comprises common text 531 and common data 532. Compilation of the source code resulting from encountering restrictive directives results in various text and data sets uniquely associated with respective processor architectures. In the illustrative example, processor-specific text and data sets 520-522 are generated by compiler 504 in response to encountering respective restrictive directives of source code 502. Each of text and data sets 520-522 are uniquely associated with respective RS64, Power4, and Power5 processor architectures. Thus, text 506 and data 507 of text and data set 520 are associated with the RS64 processor architecture, text 510 and data 511 of text and data set 521 are associated with the Power4 processor architecture, and text 514 and data 515 of text and data set 522 are associated with the Power5 processor architecture.

After the compiler has generated common text and data set 530 and per-processor text and data sets 520-522, the compiler encapsulates or otherwise consolidates common text and data set 530 as well as per-processor text and data sets 520-522 into object file 540 along with object manifest 560. Object manifest 560 specifies the different processor architectures on which executables generated from object file 540 may be installed as well as the particular processor architectures associated with encapsulated per-processor text and data included in object file 540. During generation of an executable, the linker recognizes text and data commonly associated with the different processor architectures and per-processor text and data that are uniquely associated with a particular processor architecture.

An executable 570 is generated from object file 540 that includes optimization code for a plurality of processor architectures. The optimized executable may then be run on any of the supported architectures described in the manifest.

Figure 6:
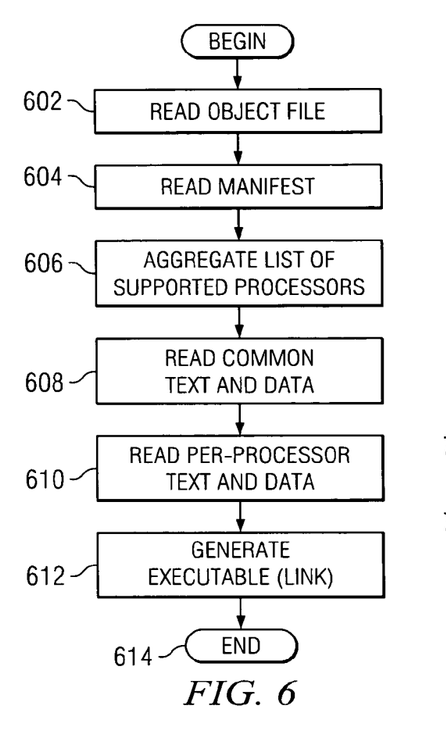
FIG. 6 is a flowchart of a linker process for generating a processor optimized executable in accordance with a preferred embodiment of the present invention.

With reference now to FIG. 6, a flowchart of a linker processor for generating a processor optimized executable from an object file is shown in accordance with a preferred embodiment of the present invention.

The linker begins by reading an object file (step 602), such as object file 540 shown in FIG. 5. The manifest is additionally read from the object file (step 604). The linker then aggregates a list of supported processor architectures (step 606). The common layer is then read (step 608), i.e., the common text and data sets for the supported processor architectures are read from the object file. Next, each of the per-processor text and data sections (that is, the virtualization layer) is read as defined by the object's manifest (step 610). The final step of "gluing" or otherwise integrating the common layer references to the virtualization layer references and vice versa are carried out in the link phase (step 612) resulting in a single executable file. The linker routine then ends (step 614).

Figure 7:
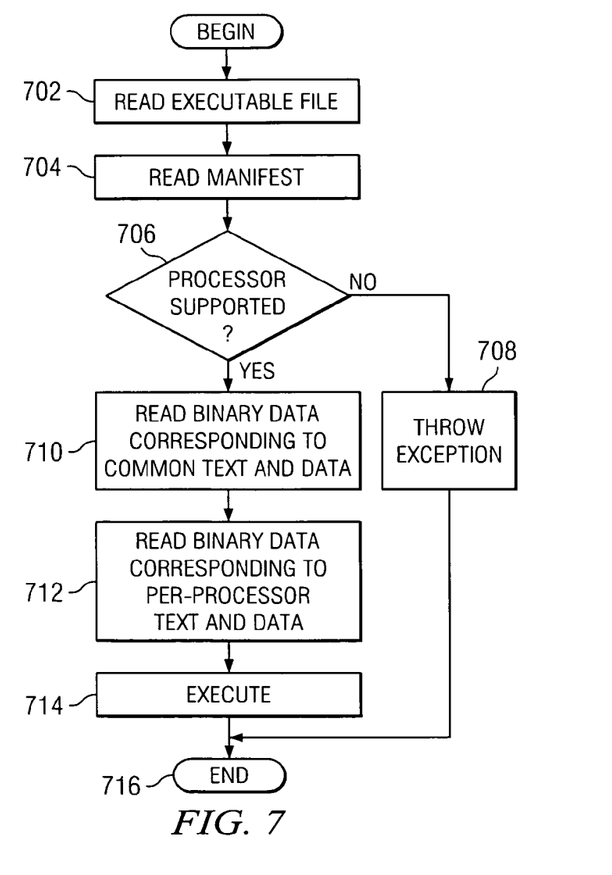
FIG. 7 is a flowchart of execution of an executable generated according to the link procedures described in FIG. 6 in accordance with a preferred embodiment of the present invention.

With reference now to FIG. 7, a flowchart of execution of an executable generated according to the link procedures described above in FIG. 6 is shown in accordance with a preferred embodiment of the present invention. The loader reads the executable file (step 702), for example executable 570 shown in FIG. 5. The manifest is then read (step 704.) An evaluation is then made to determine if the executable file supports the processor on which the executable is to run (step 706). If the executable file does not support the processor architecture, an exception is thrown (step 708), and the loader cycle then ends (step 716).

Returning again to step 706, if it is determined that the executable file supports the processor architecture on which the executable is to run, binary data of the executable that was generated from the common text and data is read from the executable file (step 710). For example, binary data generated from common text 531 and common data 532 shown in FIG. 5 is read by the loader. The loader then reads the binary data generated from the per-processor text and data that corresponds to the platform architecture on which the executable is to be run (step 712). For example, assume the system running the loader and one which the executable is to be run has a Power5 processor architecture. In this instance, the loader reads binary data of the executable that was generated from per-processor text 514 and per-processor data 515 optimized for the Power5 processor. In this instance, other binary data optimized for the RS64 and Power4 processors are ignored. The per-processor optimized executable is then executed (step 714). The loader routine then completes according to step 716.

As described, embodiments of the present invention provide a mechanism for generating a single object file from which an executable that is optimized for a plurality of processor architectures is produced. Source code is compiled into an object file that includes common text and data associated with the plurality of processor architectures and a plurality of processor-specific data and text sets. The object file may then be linked to produce an executable that is optimized for the plurality of processor architectures.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for generating an object file optimized for a plurality of processor architectures, the method comprising the computer implemented steps of:

reading a source code that includes common source code instructions and a plurality of per-processor instruction sets each associated with one of a plurality of processor architectures;

compiling the source code, wherein the common source code instructions are compiled into a common layer, and wherein the plurality of per-processor instruction sets are compiled into a virtualization layer;

generating an object file comprising the common layer, the virtualization layer, and a manifest that defines respective associations between each of the plurality of processor architectures and one of the per-processor instruction sets;

compiling a particular one of the plurality one of the plurality of pre-processor instruction sets to create particular data and particular text that are associated with a particular one of the plurality of processor architectures; and linking the object file to produce an executable file, wherein the executable file includes binary data derived from the common data, binary data derived from the common text, binary data derived from the particular data, and binary data derived from the particular text, wherein the binary data derived from the common data and binary data derived from the common text are always included in an executable file that is generated using the object file.

2. The method of claim 1, wherein the common layer comprises data and text that are associated with each of the plurality of processor architectures.

3. The method of claim 1, wherein the plurality of per-processor instruction sets each comprises per-processor data and per-processor text.

4. The method of claim 1, further comprising:

executing the executable file, wherein execution of the executable file is limited to execution of the binary data derived from the common data, the binary data derived from the common text, the binary data derived from the particular data, and the binary data derived from the particular text.

5. A computer-recordable physical storage medium for generating an object file optimized for a plurality of processor architectures comprising:

first instructions that read a source code that includes common source code instructions and a plurality of pre-processor instruction sets, wherein each one of the plurality of pre-processor instruction sets is associated with one of a plurality of processor architectures;

second instructions that compile the source code, wherein the common source code instructions are compiled to create common data and common text that are included in a common layer, and wherein each one of the plurality of pre-processor instruction sets are compiled into a virtualization layer;

third instructions that generate an object file comprising the common layer, the virtualization layer, and a manifest that defines respective associations between each of the plurality of processor architectures and one of the pre-processor instruction sets, fourth instructions that compile a particular one of the plurality one of the plurality of pre-processor instruction sets to create particular data and particular text that are associated with a particular one of the plurality of processor architectures; and fifth instructions that link the object file to produce an executable file, wherein the executable file includes binary data derived from the common data, binary data derived from the common text, binary data derived from the particular data, and binary data derived from the particular text, wherein binary data derived from the common data and binary data derived from the common text are always included in an executable file that is generated using the object file.

6. The computer-recordable physical storage medium of claim 5, wherein the common data and the common text are associated with all of the plurality of processor architectures.

7. The computer-recordable physical storage medium of claim 5, wherein the plurality of pre-processor instruction sets each comprise pre-processor data and pre-processor text.

8. Computer-recordable physical storage medium of claim 5, further comprising:

sixth instructions that execute the executable file, wherein execution of the executable file is limited to execution of the binary data derived from the common data, the binary data derived from the common text, the binary data derived from particular data, and the binary data derived from the particular text.

9. A data processing system for generating an object file optimized for a plurality of processor architectures, comprising:

a memory that contains a compiler a set of instructions; and a processing unit, responsive to execution of the set of instructions, that:

reads a source code that includes common source code instructions and a plurality of pre-processor instruction sets, wherein each on of the plurality of pre-processor instructions sets is associated with one of a plurality of processor architectures;

compiles the source code, wherein the common source code instructions are compiled to create common data and common text that are included in a common layer, and wherein each one of the plurality of pre-processor instruction sets are compiled into a virtualization layer;

generates an object file comprising the common layer, the virtualization layer, and a manifest that defines respective associations between each of the plurality of processor architectures and one of the pre-processor instruction sets, compiles a particular one of the plurality of pre-processor instruction sets to create particular data and particular text that are associated with a particular one of the plurality of processor architectures; and links the object file to produce an executable file, wherein the executable file includes binary data derived from the common data, binary data derived from the common text, binary data derived from the particular data and binary data derived from the particular text, wherein binary data derived from the common data and binary data derived from the common text are always included in an executable file that generated using the object file.

10. The data processing system of claim 9, wherein the processor generates a manifest that defines respective associations between each of the plurality of processor architectures and one of the pre-processor instruction sets.

11. The data processing system of claim 9, wherein the common data and the common text are associated with each of the plurality of processor architectures.

12. The data processing system of claim 9, wherein the plurality of per-processor instruction sets each comprises per-processor data and per-processor text.

13. The data processing system of claim 9, wherein each of the plurality of per-processor instruction sets is delineated within the source code with a respective directive.

\* \* \* \* \*